Dec. 2, 1958
A. A. SPISAK
2,862,235
MOLDING APPARATUS
Filed Dec. 15, 1954
5 Sheets-Sheet 1
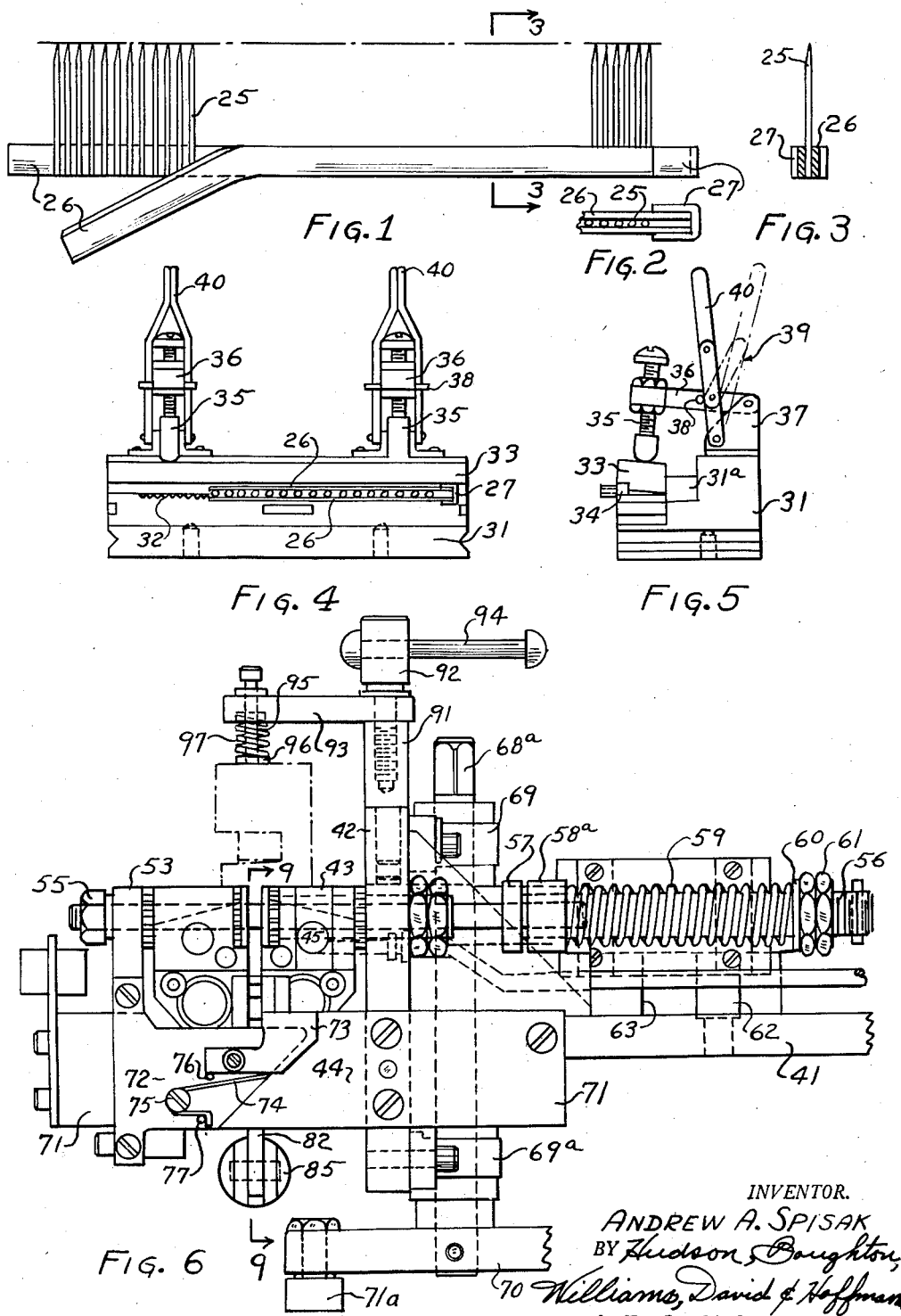
INVENTOR.
ANDREW A. SPISAK
BY Hudson, Boughton,
Williams, David & Hoffman
ATTORNEYS Dec. 2, 1958  A. A. SPISAK  2,862,235
MOLDING APPARATUS
Filed Dec. 15, 1954  5 Sheets-Sheet 2

INVENTOR.
ANDREW A. SPISAK
BY Hudson, Boughton,
Williams, David & Hoffmann
ATTORNEYS Dec. 2, 1958
A. A. SPISAK
2,862,235
MOLDING APPARATUS
Filed Dec. 15, 1954
5 Sheets-Sheet 3
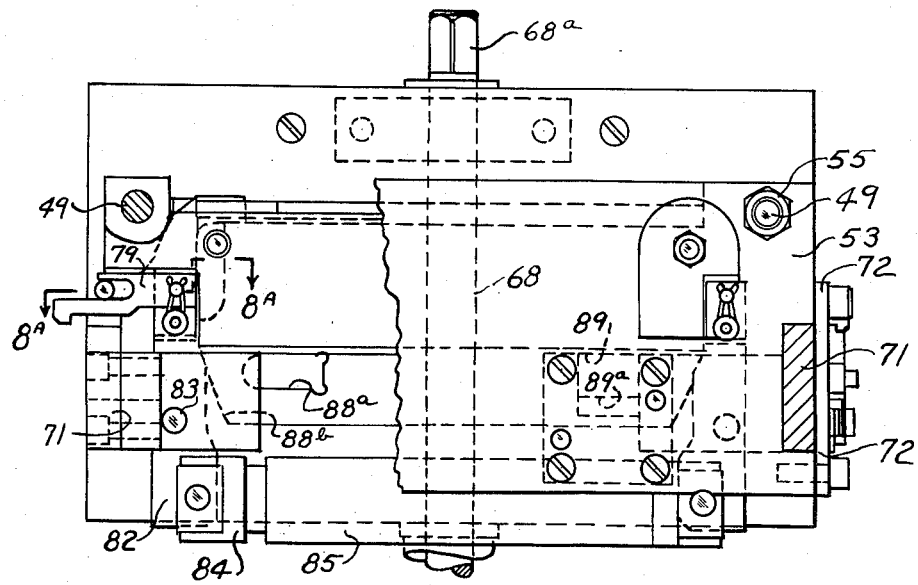
FIG. 8
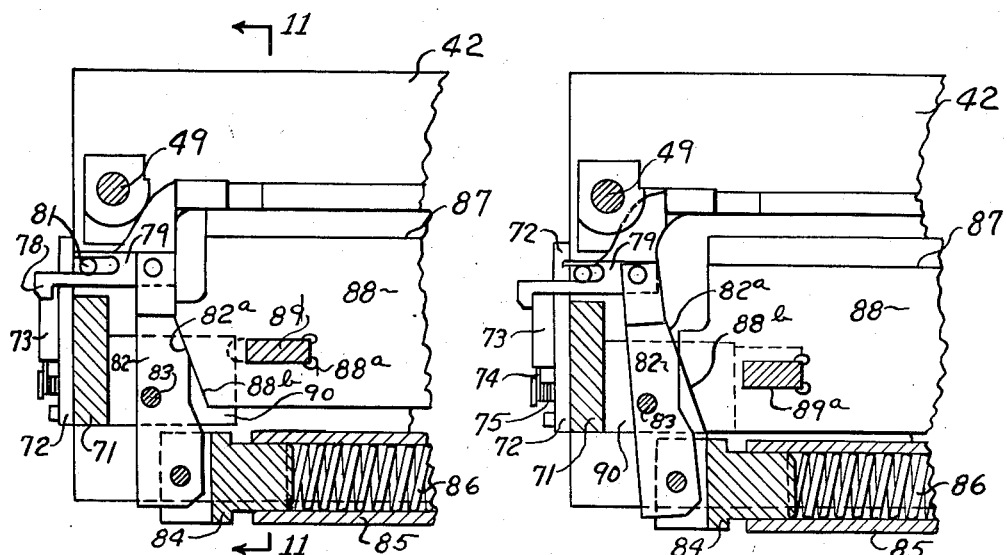
FIG. 9
FIG. 10
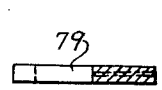
FIG. 8A
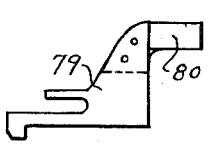
FIG. 8B
INVENTOR.
ANDREW A. SPISAK
BY Hudson, Boughton,
Williams, David & Hoffmann
ATTORNEYS

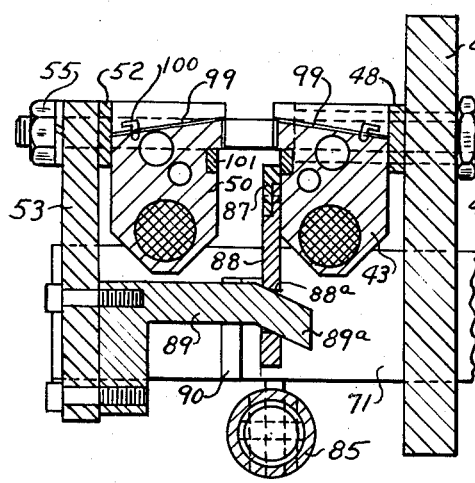
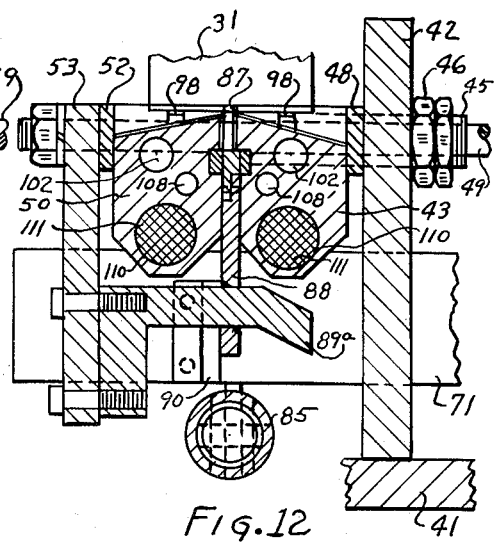
Fig. 11  Fig. 12
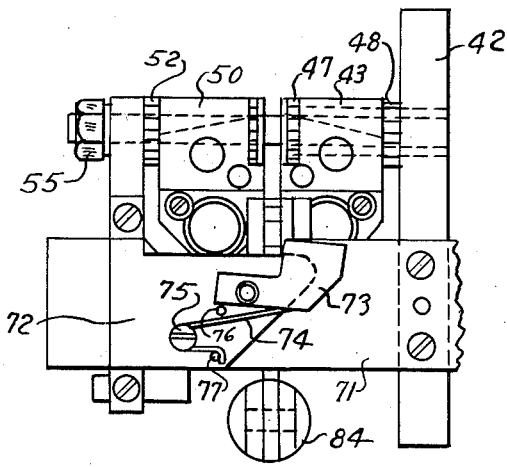
Fig. 13  Fig. 16
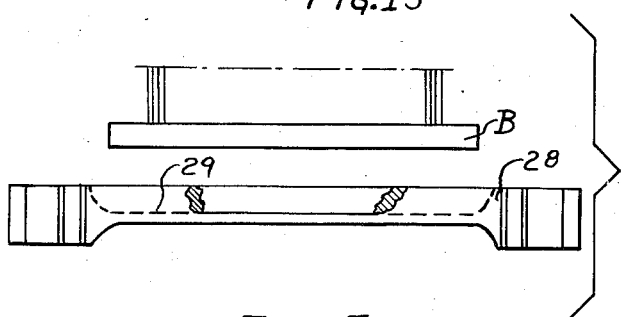
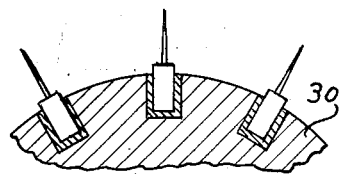
Fig. 15  Fig. 17
INVENTOR.
ANDREW A. SPISAK

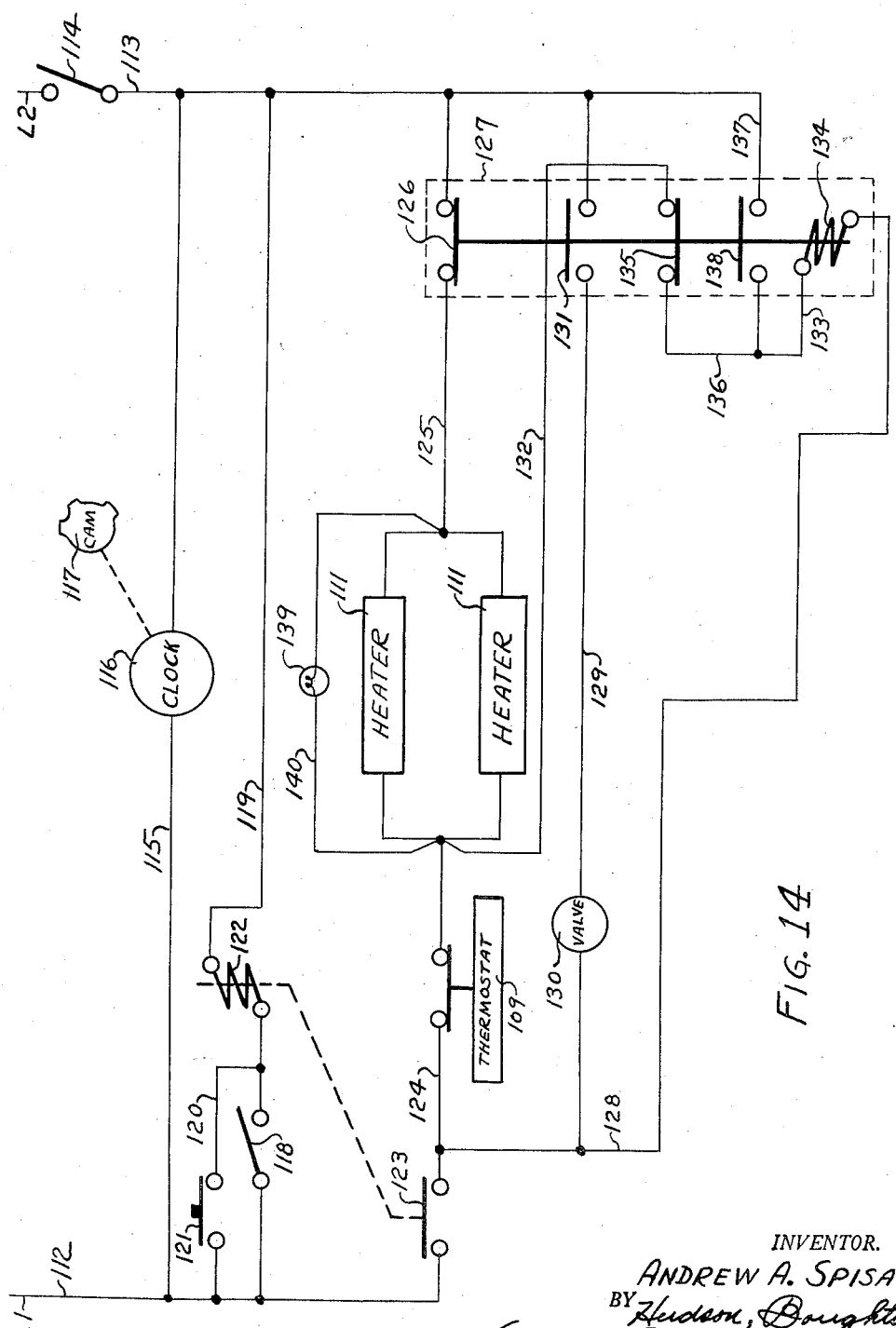

United States Patent Office 2,862,235
Patented Dec. 2, 1958

2,862,235
MOLDING APPARATUS

Andrew A. Spisak, Cleveland, Ohio, assignor to The Warner & Swasey Company, Cleveland, Ohio, a corporation of Ohio Application December 15, 1954, Serial No. 475,363

7 Claims. (Cl. 18—22)

This invention relates to molding apparatus and more particularly to an apparatus for molding pin strip insert units for use in fiber combing apparatus and which units can be mounted and secured in supporting elements of said fiber combing apparatus as, for instance, in faller bars, quill rolls or the like.

Various types of apparatus are employed for combing fibers for the production of fiber-containing products, such as textiles and the molding apparatus embodying the present invention, for purposes of illustration, will be described with reference to textile combs of the type usually designated faller bars used in gill boxes, but it will be understood that the invention has broader utility and can also be used in connection with quill rolls or other similar elements of fiber combing apparatus or for other purposes.

An object of the invention is to provide an improved and novel molding apparatus particularly adapted for producing pin strip insert units for use in fiber combing apparatus and which molding apparatus facilitates the production of the insert units and results in the production of combing pin insert units wherein the pins are accurately positioned and are securely held while the insert units can be readily and securely mounted in supporting elements such as faller bars, quill rolls and the like.

Another object is to provide a molding apparatus particularly adapted for producing combing pin strip insert units in a manner which is economical, and such that the units will be produced to close tolerances and with accurate disposition of the pins with the butts of the pins securely anchored.

A further object is to provide an improved molding apparatus which is efficient in operation and relatively simple in construction.

Additional and more detailed objects will be pointed out hereinafter during the following description of the molding apparatus embodying the invention, with reference to the accompanying drawings forming part of this specification, and wherein:

Fig. 1 is an elevational view illustrating a pin strip insert unit prior to molding and setting the base thereof and detached from its pin holding fixture or book and showing the formation of the insert unit at an intermediate point in its evolution, with a portion of one plastic strip on one side of the base of the insert unit turned back to illustrate the butts of the pins which are shown positioned against the other plastic strip on the other side of the base.

Fig. 2 is a fragmentary top plan view of the right hand end of Fig. 1.

Fig. 3 is a sectional view taken substantially on line 3—3 of Fig. 1, looking in the direction of the arrows.

Fig. 4 is a front elevational view of a holding fixture or book for the pins and wherein the pointed ends of the pins are inserted into engagement with a locating surface with the butts extending outwardly of the fixture or book to have applied thereto the strips of plastic material which forms the base of the finished insert unit.

Fig. 5 is an end elevational view of the fixture or book shown in Fig. 4.

Fig. 6 is an end elevation of an apparatus for molding and setting the base material of the unit under heat and pressure about the butts of the pins and shown in dashdot lines the fixture or book of Figs. 4 and 5 mounted in position on the apparatus and with the butts of the pins and the base material located between the relatively movable molding jaws of the apparatus.

Fig. 8 is a front elevational view of the apparatus shown in Fig. 7 and is taken looking from the left hand side of Fig. 7.

Fig. 8a is a detached sectional view of a portion of Fig. 8 taken on line 8a—8a.

Fig. 8b is a plan view of an element shown in Fig. 8a.

Fig. 9 is a fragmentary transverse sectional view taken approximately on line 9—9 of Fig. 6, looking in the direction of the arrows.

Fig. 10 is a fragmentary sectional view similar to Fig. 9 but with the parts in different operative relationship.

Fig. 11 is a longitudinal sectional view taken approximately on line 11—11 of either Fig. 7 or Fig. 9, looking in the direction of the arrows.

Fig. 12 is a sectional view similar to Fig. 11 but showing the parts in different operative relationship.

Fig. 13 is a fragmentary side elevational view of a portion of the apparatus shown in Fig. 7 and is taken looking from the lower side of Fig. 7 as viewed in the drawings and with certain parts omitted.

Fig. 14 is a diagram of the timing mechanism and electrical circuits for the heating elements and for controlling the same and the water cooling system.

Fig. 15 is an exploded view showing the finished pin strip insert unit and a faller bar having a groove into which said finished insert unit can be mounted and secured.

Fig. 16 is a transverse section of the finished strip insert unit shown in Fig. 15, and Fig. 17 is a fragmentary sectional view of a quill roll in the groove of which strip insert units constructed in accordance with the present invention have been inserted for securing the same therein.

Figure 7:
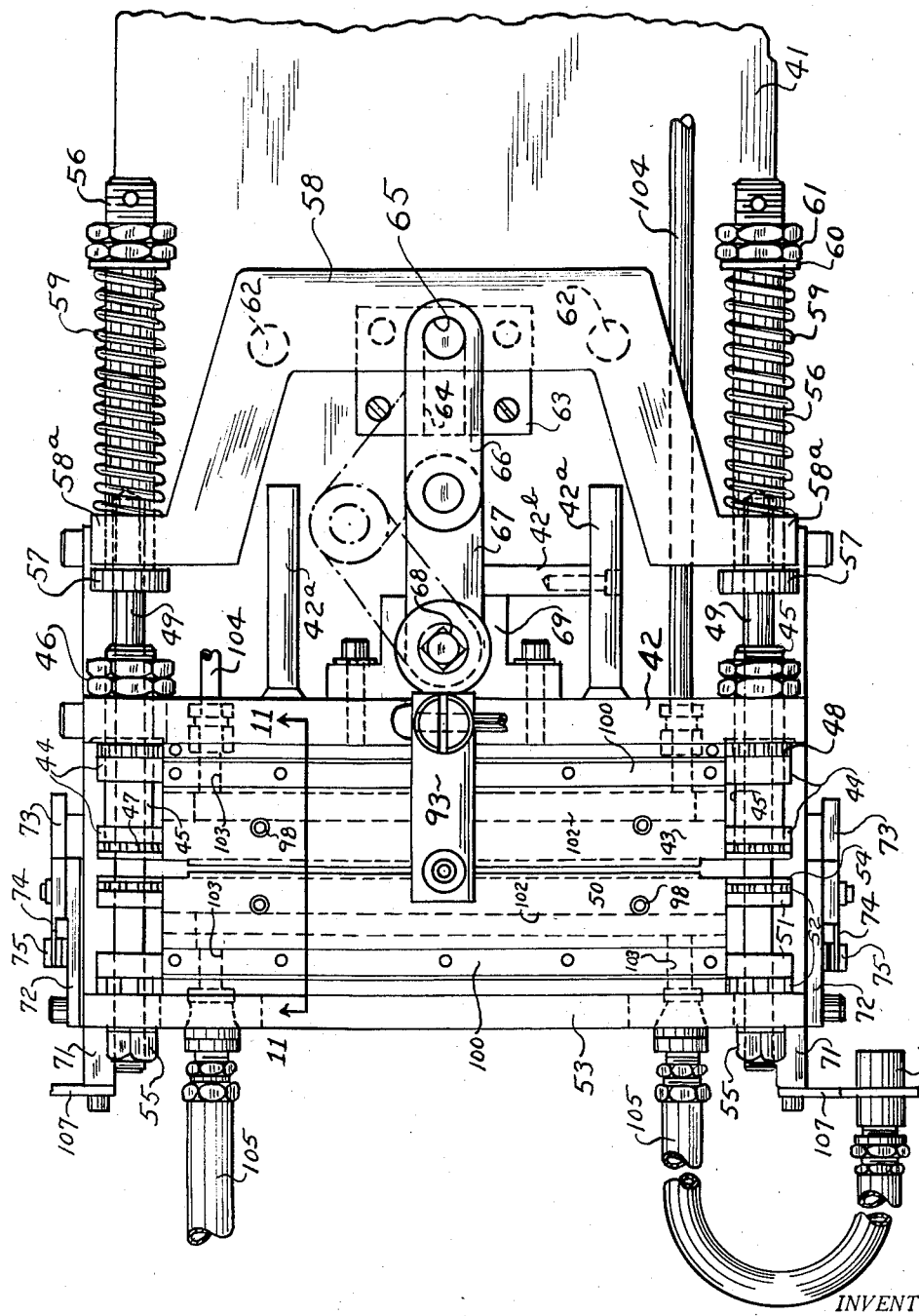
Fig. 7 is a plan view of the apparatus shown in Fig. 6.

In describing the process embodying the invention reference should first be had to Figs. 1, 2 and 3. The pin strip insert unit constructed by the process includes a series of spaced parallel pins, the butt ends of which are securely anchored in a base portion which is formed of suitable thermosetting plastic material.

In Fig. 1 the series of spaced parallel pins is indicated at 25. These pins are positioned in the locating grooves of a book or jig fixture and have their pointed or outer ends engaging against a locating surface and said book or fixture securely clamps the pins in properly spaced parallel relationship, with the butt ends of the pins extending outwardly of the fixture or book and fully exposed.

When the series of pins has been placed in the fixture or book and clamped therein the exposed butt ends of the pins are thoroughly cleaned to remove therefrom all foreign or chemical matters. The cleaning of the butt ends of the pins may be carried out in various ways, as for instance, said butt ends may be thoroughly sand blasted on the entire surface of the butt ends or they may be cleaned by a chemical cleansing operation or by any other known cleaning operation. Preferably the pin butts are sand blasted from a plurality of directions to insure cleaning and roughening of all butt surfaces. After the pin butts have been cleaned they are brushed with a methyl ethyl ketone solution; then the pin butts are given a thin coating of a suitable bonding agent solution which assists in causing good adhesion and bonding between metal and thermosetting plastics as, for instance, a hycar resin composition such as "Plastilock 604" commercially obtainable from The B. F. Goodrich Company, Akron, Ohio. The bonding material can be applied by a suitable brushing means and should be applied to ehe entire surface of the butt ends of the pins and then allowed to dry.

Then two strips 26 of thermosetting plastic of suitable length, width and thickness are placed against the pin butts on opposite sides thereof and in parallel relationship with each other with the ends of the strips extending a predetermined distance beyond the ends of the series of pins.

The thickness, length and width of the strips 26 are determined so as to provide the proper extra amount of material at the ends for compressions during molding and by the dimensions of the groove into which the insert eventually is to be positioned and secured so that the base of the insert will interfit the groove with close tolerances. The thermosetting plastic strips can be formed of commercially available uncured thermosetting tape of the desired dimensions. The strips may be formed of suitably vulcanized rubber, neoprene or of blended hycars. As now believed, the preferable thermosetting material for the strips is "Plastilock 601" available commercially from The B. F. Goodrich Company, Akron, Ohio. The commercially available thermosetting plastic strips usually are provided on one side with a protective removable backing and in using such strips it is desirable to brush the unprotected side lightly with a thinning cleansing solution such as methyl ethyl ketone before applying the unprotected sides of the strips to the pin butts. When the strips have been applied to the pin butts the removable protective backings on the outer sides of the strips can then be removed therefrom.

After the strips 26 have been applied to the pin butts, as indicated in Fig. 1 and as described above, then short strips 27 of the same thermosetting plastic material and of the same width and thickness as the strips 26 are positioned on the ends of the strips 26 so as to embrace the same as clearly indicated in Fig. 2.

The purpose of the short U-shaped strips 27 is to provide sufficient material at the ends of the base of the unit so that during the molding operation and under endwise pressure on the strips 26 the material of the strips 27 will assure sufficient material at the ends of the unit outwardly of the series of pins to properly anchor the end pins in the base and to provide the base with end portions of proper size and sufficient structural strength and mass. In other words, the ends of the base strip insert beyond the pins must be molded to have the same thickness as that part of the base wherein the pins are molded and the short U-shaped strips 27 provide the additional molding material to produce the solid extended end portions of the base of the strip with the same width and thickness as the remainder of the strip.

The pins having been clamped in a series and in proper parallel spaced relationship in the fixture or book with the butt ends exposed, said butt ends having been cleaned and treated as above stated and the strips 26 and 27 of thermosetting plastic having been applied to the butt ends as already described, the fixture or book is now positioned upon a suitable mold so that the butt ends with the plastic strips thereon extend into the mold cavity. The mold is of a suitable type to apply heat and pressure to the thermosetting plastic strips and pin butts from the sides, ends and bottom thereof to mold the plastic strips about the pin butts to form the base of the insert unit to the desired proper length, width and thickness so that the base of the insert will interfit the groove in the supporting member with close tolerances.

During the molding operation the pressure is maintained on the plastic strips and pin butts throughout. The temperature is increased or builds up throughout the molding operation to a maximum temperature and this build-up of the temperature may be divided into three phases or periods, namely, a flow period of approximately three-nines of the total time; a bonding period of approximately four-ninths of the total time and a setting period of approximately two-ninths of the total time of the molding and curing operation. When the molding and curing operations have terminated the mold and the base of the insert are cooled rapidly until the thermosetting plastic of the base has thoroughly solidified. This cooling may be done in various known ways but preferably it should be done so as to effect a rapid cooling down of the mold and the base of the insert and this can be accomplished by providing the mold with suitable passageways into which a coolant, such as water, can be introduced immediately that the maximum temperature has been reached at the end of the setting period. It has been found that the molding and setting of the base of the insert can be accomplished in a heating time of approximately fifteen to twenty-one minutes and of this total heating time the flow period portion will take approximately five to seven minutes, the bonding period portion approximately seven to nine minutes and the setting period approximately three to five minutes.

It will be understood that during the flow period the thermosetting plastic softens and flows around the butt ends of the pins and also flows under the mold pressure into the confiuration of the base of the insert. This flow period also effects expulsion of any air or gases which might be included in the mold cavity.

During the bonding period the plastic and bonding materials under the action of the pressure and heat are bonded together and to the butts of the pins while during the setting period the plastic and bonding materials under the pressure and the heat become cured and set in the molded configuration imparted thereto and adhere to the pin butts.

It has been found that the temperature of the mold and base for the molding operation should increase from approximately room temperature or slightly above to approximately 210° F. to 230° F. during the flow period. During the bonding period the temperature should increase from the temperature at the end of the flow period to approximately 330° F. to 350° F. and during the setting period the temperature should increase from the temperature at the end of the bonding period to approximately 415° F. to 435° F. as the maximum temperature required for the molding operation.

It is preferable after the maximum temperature has been attained to rapidly cool the mold and the molded base of the insert and it has been found that by discontinuing the heat at this maximum temperature point and passing coolant through the passages in the mold the temperature can be rapidly cooled to substantially room temperature in a minimum cooling period of approximately two minutes. As soon as the cooling of the mold and insert has taken place the mold is opened and the insert removed therefrom still mounted in its fixture, after which the fixture or book is opened and the completed pin strip insert unit removed therefrom.

The completed pin strip insert unit is illustrated in elevation in Fig. 15 and in section in Fig. 16 and said unit may be mounted in a faller bar 28 of conventional construction and illustrated in Fig. 15.

It will be understood that the base B of the finished pin strip insert unit and formed of the molded thermosetting plastic strips 26 and 27 with the pin butts embedded and anchored therein is positioned in the groove 29 of the faller bar and secured therein in any suitable manner or as disclosed in my copending application, Serial No. 475,425, filed December 15, 1954.

Of course the completed unit might be inserted and secured in a receiving groove in some other form of supporting member used in fiber combed apparatus as, for instance, in the grooves of a quill roll 30 as shown in Fig. 17. Although the grooves of the quill roll 30 are shown as extending radially of the roll, it will be understood that said grooves might be inclined with respect to radial lines of the quill roll.

The book or fixture and the molding apparatus for carrying out the above described process may take various forms. A particular form of book or fixture and molding apparatus have been illustrated in the drawings and will be described herein as they are particularly adapted for performing the process.

The book or fixture will be described first briefly with reference to Figs. 4, 5 and 6 of the drawings. The fixture or book illustrated forms per se no part of the present invention and it is only when such fixture is used in combination with the molding apparatus illustrated and described that the fixture or book forms an element of a combination embodying the invention.

The fixture or book comprises a body portion 31 which on its upper side is of stepped formation. The lowermost step of the upper side of the body 31 is provided with a series of predeterminedly spaced parallel grooves 32 that extend transversely of the step and of a size and spacing to receive the lower half of the pointed ends of the pins 25 and to space said pins properly in the longitudinal series of pins. When the pins 25 are placed in the grooves 32 the pointed ends of the pins abut a locating bar 31a extending longitudinally of the first step. The width of the lowermost step outwardly of the locating bar 31 is such that the butt ends of the pins project laterally of the body 31 and will be in an exposed position wherein they can be cleaned and treated and the plastic strips 26 and 27 positioned thereon for the molding operation.

The fixture or book also includes a movable clamping block 33 of the length and width of the lowermost step outwardly of the locating bar 31a and said block on its undersurface and adjacent its outer underside edge mounts a resilient strip 34 which engages and bears upon the pins when the block 33 is clamped in position. The block 33 and the resilient strip 34 are clamped in position to rigidly hold the pins in the grooves 32 of the fixture or book by means of clamping posts 35, the lower ends of which bear upon the upper surface of the block 33.

The clamping posts 35 have threaded portions which are adjustably mounted in the outer or free ends of pivoted lever arms 36, the opposite ends of which arms are pivoted to upstanding lugs or brackets 37 on the body 31. The lever arms 36 intermediate their ends mount transversely extending pins 38, the opposite ends of which project laterally beyond the lever arms.

Toggle clamping mechanisms are operatively connected to the lever arms 36 and comprise links 39 having one of their ends pivotally connected to the lever arms 36 and their opposite ends pivotally connected to clamping levers 40, the lower ends of which straddle the lever arms 36 and are pivotally connected to the lugs or brackets 37 at a lower level than the pivotal connection thereto of the lever arms 36.

It will be seen when the clamping lever 40 is rocked to the position shown in Fig. 5 that the centers of the pivotal connection of the links 39 with the lever arms 36 and the clamping arms 40 are in a substantially straight line which lies to one side of the vertical line through the pivotal connection of the levers 40 with the brackets 37 so that the toggle has a locking effect and the levers 40 are maintained in pressing contact with the pins 38 to hold the clamping posts firmly against the block 33.

The fixture or book with the pins 25 clamped therein as shown in Figs. 4 and 5 and with the outwardly projecting butt ends of the pins prepared as hereinbefore described and provided with the thermosetting plastic strips 26 and 27 is mounted on a molding apparatus now to be described and in a position turned 90° from the position shown in Figs. 4 and 5 and as illustrated by dash and dot lines in Fig. 6. When the book or fixture is thus mounted the projecting butt ends of the pins and the plastic strips thereon extend downwardly between the relatively movable jaws of the molding apparatus. The detailed way in which the book or fixture is mounted and clamped in position on the molding apparatus will be pointed out hereinafter in connection with the detailed description of said apparatus.

The molding apparatus illustrated in the drawings comprises a base plate 41 which is provided with a vertically extending supporting and guiding plate 42. Angular braces 42a extend between the base plate 41 and the plate 42. A stationary jaw of the molding apparatus is indicated at 43 and said stationary jaw 43 extends parallel to the vertical plate 42 on the opposite side thereof from the braces 42a and is provided at its opposite ends with spaced parallel ears or lugs 44 which, in turn, have centrally aligned openings therein that register with suitable openings in the vertical plate 42. Sleeves 45 project through each pair of lugs 44 and through the openings in the vertical plate 42, said sleeves 45 being provided at their ends adjacent to the lugs 44 with heads or shoulders and being threaded at their other ends to receive lock nuts 46.

Intermediate the shouldered ends of the sleeves 45 and the adjacent ears or lugs 44 are corrugated heat insulating spacers 47. Also between the other ears or lugs 44 and the vertical plate 42 are located insulating spacers 48. It will be seen that the stationary jaw 43 is securely connected to the vertical plate 42 in spaced relationship thereto by the sleeves 45, ears or lugs 44, insulating spacers 47 and 48 and the lock nuts 46. The sleeves 45, in addition to rigidly connecting the stationary jaw 43 to the vertical plate 42, also form supporting guideways for slidable rods 49 which support the movable jaw 50 that is parallel to and of the same length as the stationary jaw 43 and is provided on its opposite ends with spaced ears or lugs 51 through which the rods 49 extend.

Insulating spacers 52 are mounted on the rods 49 intermediate the ears or lugs 51 and a vertical clamp plate 53 and shoulders 54 formed on the rods 49. The movable jaw 50, rods 49 and clamp plate 53 are clamped together by nut and lock washers 55 screwed on the ends of the rods 49 and engaging the clamp plate 53 so that they move as a unit.

The rods 49, as already stated, extend through the sleeves 45 and said rods have their extending ends threaded and screwed into one end of spring supporting sleeves 56 which are provided with shoulders or collars 57 at said one end and which pass through openings formed in the aligned ears 58a at the ends of a U-shaped member 58, the purpose of which will later become clear.

The shoulders or collars 57 are adjacent the ears 58a on one side thereof and coil springs 59 surround the sleeves 56 and abut the ears 58a on the other side thereof and washers 60 held in position on the sleeves 56 by lock nuts 61 screwed on the threaded ends of the sleeves so that predetermined spring tension can be given to the springs 59.

The U-shaped member or yoke 58 slidably engages and is supported by spaced upstanding posts or buttons 62 anchored in and extending upwardly from the base plate 41 and acting to support and guide the U-shaped member 58 for movement in a horizontal plane. Intermediate the posts 62 there is secured to the base plate 41 a block 63 which is provided with a centrally located slot 64 that extends longitudinally of the apparatus and is parallel to the rods 49. The U-shaped member or yoke 58 mounts centrally of its base or connecting portion a hinge pin 65 which projects below the member 58 and into the slot 64 of the block 63 so that straight line movement in a horizontal plane can be imparted to the member 58. The pin 65 also extends above the member 58 and forms a pivot pin to which one end of the link 66 of a toggle mechanism is pivotally connected. The opposite end of the link 66 is pivotally connected to the free end of a lever arm 67, the opposite end of which arm 67 is either integral with or fixed to a vertically extending shaft 68, the upper end of which is provided with a square wrench receiving head 68a.

The shaft 68 is rotatably mounted in an upper bearing support or block 69 and in a lower bearing support or block 69a that are bolted or otherwise secured to the vertically extending plate 42 and said shaft 68 extends downwardly below the base plate 41 as shown in Fig. 6 and has fixed to its lower end a double arm lever 70 provided on its opposite ends with pivoted shoes 71a (only one of which is shown) adapted to cooperate with operating cams (not shown) where a plurality of the molding apparatus in circularly spaced relationship are mounted on a turntable and the jaws of which are opened and closed sequentially by automatic mechanism. However, for the purposes of the present disclosure it may be assumed that the molding apparatus is operated manually by means of a wrench applied to the upper end 68a of the shaft 68.

It will be seen that rotation of the shaft 68 in a clockwise direction straightens the toggle to the full line position of Fig. 7 and against the stop plate 42b secured to one of the braces 42a with a resulting movement toward the right of the member 58 which, acting through the springs 59, moves the sleeves 56 and rods 49 to move the movable jaw 50 toward the stationary jaw 43. This movement of the movable jaw 50 toward the stationary jaw 43 will be described in greater detail hereinafter as will also the action of the springs 59 and the collars 57 of the sleeves 56.

When the wrench applied to the upper end 68a of the shaft 68 is swung in a counterclockwise direction the toggle is moved to the open position as indicated by dot and dash lines in Fig. 7 and this causes the ears 58a of the yoke member 58 to act on the collars 57 of the sleeves 56 and move the rods positively toward the left to effect positive movement of the movable jaw 50 away from the stationary jaw 43.

Secured to the longitudinal side edges of the base plate 41 and to the ends of the vertical plate 42 are horizontal guide rails 71 which are located at the opposite ends of the movable jaw 50 and pass through grooves in the side ends of the movable clamp plate 53 and which grooves are located adjacent the lower end of said clamp plate, see Figs. 6 to 10 inclusive.

The rails 71 closely interfit the said grooves so as to guide the clamp plate 53 and the movable jaw 50 during the horizontal inward and outward movements thereof. Plates 72 are bolted or otherwise secured to the side ends of the clamp plate 53 and cover the grooves through which the guide rails 71 extend and are in contact with said guide rails.

The guide rails 71 extend longitudinally of the base plate 41 and are parallel to each other and to the rods 49. The plates 72 extend longitudinally of the guide rails 71 and when the clamp plate 53 and movable jaw 50 move with the rods 49 the plates 72 move along the outer surfaces of the guide rails 71. The plates 72 on their outer sides and adjacent their inner ends as viewed in Figs. 7 and 13 mount pivoted holding pawls 73 which extend slightly beyond the ends of the plates 72 and are normally held in raised active position against stops 76 located to one side of the pivots therefor by means of springs 74 engaging the undersides of the pawls and on the other side of the pivots therefor and extending around anchoring screws 75 carried by the plates 72. The springs 74 after extending around the anchoring screws 75 have projecting ends extending around pins 77.

The pawls 73 cooperate with the hooked ends 78 of inwardly and outwardly movable slide members 79 which on their inner ends mount end jaws 80 preferably formed of blocks of material to which the plastic being molded will not adhere as, for example, Teflon. The members 79 are formed adjacent their inner ends with forked elbow portions and the jaws 80 are mounted in said portions between the tines thereof and rigidly secured in position with one of the ends of the jaws projecting inwardly beyond the ends of the forked portions as clearly shown in Fig. 8b. The slide members 79 are guided in their sliding movements by guide pins 81 extending into slots formed in the members.

The slide members 79 adjacent the end jaws 80 have pivotally connected thereto the upper ends of rocker arms 82 which are pivoted intermediate their ends at 83 on plates later to be referred to and have their lower ends pivotally connected to spring actuated heads 84 which slide in the opposite ends of a tubular spring housing 85 which extends transversely of the apparatus beneath the guide rails 71 and houses a coil spring 86, the opposite ends of which engage the slidable heads 84 and normally urge the latter in an outward direction relative to the housing 85. The end jaws 80 when the hooked ends 78 of the slide members 79 are free from the holding pawls 73 are moved inwardly simultaneously by the spring 86 acting on the heads 84 and rocking the rocker arms 82 as will later be pointed out.

The bottom jaw 87 is secured to the upper end of a vertically movable plate 88 which extends transversely of the apparatus and is provided adjacent its lower portion with openings 88a spaced transversely of the apparatus and having their upper and lower walls partially inclined or beveled to the vertical.

The clamping plate 53 has secured to it beneath the movable jaw 50 horizontally extending actuating arms 89, the outer ends of which are downwardly inclined as indicated at 89a so as to pass through the openings just referred to and cooperate with the upper and lower walls of the openings to effect camming of the plate 88 in a vertical direction upwardly or downwardly during linear movements of the clamping plate 53 and movable jaw 50. The engagement of the sides of the arms 89 and of the inclined end portions 89a with the side walls of the openings 88a in the plate 88 maintain said plate against shifting movement transversely of the apparatus.

The bottom jaw 87 mounted on the upper end of the plate 88 is formed of a material to which the thermosetting plastic being molded will not adhere as for example Teflon. The bottom jaw 87, as clearly shown in Figs. 11 and 12, has a rabbeted interfit with the upper end of the plate 88 and is suitably secured to the plate. One side of the vertically movable plate 88 normally engages the inner side of the stationary jaw member 43 and is held against movement away from such engagement when the arms 89 move outwardly with the clamping plate 53 and the movable jaw 50 by angle plates 90 secured to the inner sides of the guide rails 71 and contacting the other side of the plate 88. The angle plates 90 also mount the pivots 83 for the rocker arms 82 previously described.

The rocker arms 82 on their inner side edges are provided with inclined camming surfaces 82a which cooperate with inclined camming surfaces 88b on the opposite ends of the vertically movable plate 88. These cooperating camming surfaces function during the vertical movements of the plate 88 to cam the rocker arms 82 outwardly or to permit said rocker arms 82 to swing inwardly under the action of the spring 86 as will later be pointed out in the description of the operation of the apparatus.

The vertically extending supporting and guiding plate 42 on its upper edge and midway between its opposite ends mounts a stud 91 suitably secured thereto and provided with a threaded bore in which the threaded stem of a clamping screw threads when the capstan head 92 of the clamping screw is turned in one or the other direction. A clamping arm 93 is mounted on the clamping screw intermediate the end of the stud 91 and the head 92 so as to be free to swing about the screw as an axis when the head 92 is backed off or to be clamped between the stud 91 and the head 92 when the head is screwed down. The head 92 is provided with a diametral opening in which a handle or capstan bar 94 is slidably mounted and which handle bar the operator uses to turn the head 92.

The clamping arm 93 at its outer end slidably supports a clamping rod 95 which has secured to its lower end a clamping shoe or foot 96, the upper end of said rod being provided with a head. A coil spring 97 surrounds the clamping rod 95 with one of its ends abutting the shoe 96 and its opposite end a recess in the underside of the clamping arm 93 and said spring acts to move the rod 95 downwardly until such movement is stopped by the engagement of the head at the upper end of the rod with the arm 93.

When the book or fixture 31 is positioned on the stationary jaw 43 and the movable jaw 50 as shown in Fig. 6 then the clamping arm 93 can be swung from an inoperative position outwardly over the fixture and the shoe 96 positioned over the fixture and in engagement centrally therewith, it being understood that the capstan head 92 has been backed off to permit this swinging movement of the arm 93. Then the capstan head 92 is screwed down to clamp the clamping arm 93 in its operative position and to cause the shoe 96 to engage the fixture under the tension of the spring 97 which while light is sufficient to prevent upward movement of the pin butts due to the pressure of the plastic being molded. The upper surfaces of the stationary jaw 43 and of the movable jaw 50 are downwardly inclined from their inner or adjacent upper edges toward their remote upper edges as clearly shown in Figs. 11 and 12.

When the fixture or book 31 is positioned on the stationary and movable jaws 43 and 50 as shown in Fig. 6, the fixture engages the inner or adjacent upper side edges of the jaws and is supported in horizontal position by accurately adjusted supporting screws 98 extending upwardly from the top surfaces of the jaws, see Fig. 12.

The supporting screws 98 are illustrated as four in number, with two being carried by each jaw, see Fig. 7. When the fixture 31 is clamped in position on top of the jaws 43 and 50 and said jaws move relatively to each other during the molding operation the support of the fixture by the screws 98 may be termed a floating support which allows the fixture to adjust itself properly under the light tensioned clamping pressure exerted thereon by the shoe 96 of the rod 95. Also as the plastic material of the strip insert being molded assumes its final shape and dimensions and the movable jaw moves in under spring pressure exerted by the springs 59 the fixture can centralize itself because of the floating support thereof effected by the screws 98 and this results in the butts of the pins 25 being properly molded in the plastic centrally of the base. In other words, the fixture or book 31 is self-adjusting because of the floating support and seeks out its own proper location as the relationship between the stationary jaw and the movable jaw changes.

In order to prevent adhesion of the thermosetting plastic to the jaws 43 and 50 during the molding operation the surfaces of said jaws which engage the plastic are covered with a suitable material which will not adhere to the thermosetting plastic as, for instance, by sheets of Teflon or similar material. The Teflon sheets are indicated in Fig. 11 at 99 and extend over the tops of the jaws and downwardly of their adjacent inner sides. The Teflon sheets 99 are clamped in position by suitable clamping strips 100 secured to the tops of the jaws adjacent their upper outer longitudinal edges and by clamping bars 101 of the same material as the sheets and mounted in recesses formed in the adjacent or inner sides of the jaws below the upper edges thereof and clamping the sheets between the bars 101 and the jaws.

The jaws 43 and 50 are provided with bores 102 for circulating water or other coolant through the jaws and said bores extend longitudinally of the jaws and are closed at their opposite ends but communicate with lateral passages 103 that are connected to water or coolant circulating conduits, with the conduits or tubing 104 being connected to the bore 102 in the stationary jaw and the flexible conduits 105 being connected to the bore 102 in the movable jaw.

The flexible conduits 105 may be connected to connecting fittings 106 carried by supporting members 107 secured to the fixed guide rails 71. The stationary jaw 43 and movable jaw 50 are each provided with a chamber or bore 108 in one of which is mounted the thermal responsive element of a thermostat controlled switch 109, see wiring diagram of Fig. 14. The stationary jaw 43 and the movable jaw 50 are each provided with a bore or chamber 110 in both of which electrical heater units 111 are mounted, see Figs. 11 and 12 and the wiring diagram of Fig. 14.

It will be understood that a suitable normally closed solenoid actuated shut off valve is provided for controlling the circulation of the water or coolant through the jaws 43 and 50, that suitable switch means for controlling the heater units 111 and suitable timing mechanism for effecting automatic opening and closing of such valve and control of said switch are operatively associated with the apparatus so that the flow, bonding and setting periods of the molding operation will be controlled automatically, and when the maximum molding temperature has been reached the heating elements will be electrically disconnected and the shutoff valve opened to effect rapid cooling of the molds and pin strip insert unit.

In Fig. 14 there is shown a wiring diagram of a control circuit for automatically timing the heating periods of the molding operation and then effecting the cooling of the jaws of the mold and of the strip insert unit by the circulation of the water or coolant and the elements of this circuit may be mounted directly on the apparatus or partially on the apparatus and partially in a control unit separate from or attached to the apparatus.

Referring to Fig. 14, an electrical supply circuit is indicated by the lines or wires 112 and 113, the latter of which contains the manual on-off switch 114. The lines 112 and 113 are interconnected by a line 115 in which is the timing clock 116. The timing clock operates a cam wheel 117 provided with three circularly spaced cam lobes of different lengths and which in turn operate a normally open micro-switch 118 in line 119 that interconnects lines 112 and 113. The line 112 is connected to the line 119 intermediate the micro-switch 118 and the line 113 by line 120 containing a normally open manual switch 121 which, if desired, can be closed for preheating the molds prior to an automatic molding operation.

The line 119 also contains the main relay coil 122 that controls the normally open main relay contact 123 located in line 124 that extends from line 112 to each heater unit 111. Each heater 111 is connected by a line 125 with the line 113. The line 124 contains the normally closed thermostat-controlled switch unit 109 previously referred to, while the line 125 contains the normally closed contact 126 of a four contact relay indicated by the rectangular dash lines 127 and the other contacts of which will later be referred to.

A line 128 extends from the line 124 intermediate the main relay contact 123 and the thermostatic unit 109 and said line 128 is connected to the line 113 by a line 129 which contains the actuating solenoid 130 that controls the opening of the normally closed water or coolant valve not shown since it may take any well known form. The line 129 also contains the normally open contact 131 of the four contact relay 127.

A line 132 extends from the line 124 intermediate the thermostatic unit 109 and the heater to a line 133 which is connected to the line 128 and contains the coil 134 for the four contact relay 127 and also the normally closed contact 135 of said four contact relay. The resistance rating of the coil 134 is much greater than that of the heating units 111. The line 133 intermediate the relay coil 134 and the normally closed contact 135 is connected by a line 136 to a line 137 that is connected to the line 113 and which contains the normally open contact 138 of the four contact relay. If desired, an indicator line may be provided to indicate when the heating elements are functioning and this line is shown at 139 and is in a line 140 extending from the line 124 to the line 125.

Assuming that the manual on-off switch 114 is closed and it is desired to preheat the mold, then the manual switch 121 is closed so that the lines 112 and 113 are electrically interconnected through the lines 120 and 119, whereupon the main relay coil 122 is energized and the normally open main relay contact 123 is closed so that the heating units 111 are electrically connected to the lines 112 and 113 through the lines 124 and 125, it being understood that the thermostatic unit is closed and that during this preheating period the light 139 will be illuminated. It will be understood also that coil 134 because of its high resistance does not actuate the four contact relay 127.

When the mold has been properly preheated the manual switch 121 is opened so that the circuit through the heaters is interrupted whereupon the main relay coil 122 is deenergized and the normally open main relay contact 123 opens and the indicator light 139 is extinguished.

The clock 116 when operatively connected to the cam 117 functions to rotate said cam at a predetermined speed correlated to time units or the different periods of the molding operation. It will be recalled that in the description of the process the molding operation was defined as having three periods, namely, the flow, bonding and setting periods, with each period of a predetermined time. Consequently the cam 117, as already stated will be provided with three cam lobes spaced circumferentially of the cam and differing in length and functioning successively during the total time of the molding operation to close the microswitch 118 for predetermined time intervals.

After the first cam lobe has closed the microswitch 118 and then has moved to an inoperative position said switch will open before the second cam lobe closes the same and likewise when the second cam lobe moves to inoperative position the switch 118 will open until the third cam lobe closes the same.

Assuming that the microswitch 118 is closed by a cam lobe then the main relay coil 122 is energized and the normally open main relay contact 123 closes, whereupon the heating elements 111 are electrically connected to the lines 112 and 113 provided that the thermostatic switch 109 is closed. At such time the solenoid 130 in line 129 which controls the opening of the normally closed water or coolant shut-off valve is not energized since line 129 contains the normally open contact 131 and therefore no water is circulating through the stationary and movable jaws. It will be recalled that coil 134 for the four contact relay 127 at this time will not actuate the relay because its resistance is so much greater than the resistance of the heating units.

Now assuming that the third lobe of the cam has closed the microswitch 118 and the heating elements 111 are energized and the maximum molding temperature is reached, then the thermostatic switch unit 109 opens to break the electrical circuit to the heating elements 111. However, since the main relay contact 123 is still closed due to the length of the third cam lobe an electrical circuit extends from the line 124 through the lines 128 and 133 to the heaters and thence through line 125 to line 113. This maintains the circuit in the heaters momentarily but since line 133 contains the high resistance relay coil 134 which now becomes fully energized, normally closed contacts 135 and 126 open and normally open contacts 131 and 138 close. The circuit to the heaters is now interrupted and solenoid 130 is energized to open the shut-off valve for the water or coolant. The third lobe of cam 117 is of such length that microswitch 118 is held closed until the cooling of the molds has been completed.

The operation of the apparatus hereinbefore described will now be set forth in order to bring out the cooperation between the various parts or elements of the apparatus.

It may be assumed that a pin strip insert unit has been prepared as hereinbefore described, to the point where said unit is placed and clamped in the book or fixture 31 with the butt ends of the pins covered by the plastic strips. Also it may be assumed that the toggle 66, 67 is in broken or open position as indicated by dot-dash lines in Fig. 7, at which time the movable jam 50 and clamp plate 53 will be in their outermost position with respect to the stationary jaw 43. Also at this time the actuating arms 89 and their inclined ends 89a will have moved the plate 88 and bottom jaw 87 to their lowermost position and the rocker arms 82 will have been rocked and held in their outermost position to move and hold the members 79 and end or side jaws 80 in their outermost position. At this time the hooked ends 78 of the members 79 will be located outwardly beyond the pawls 73 which will be held in their active positions by the springs 74.

It can also be assumed that the manual switch 121 has been closed sufficiently long to preheat the jaws to approximately the starting temperature used in the molding operation and then opened. Further assuming that the capstan nut 92 has been backed off and the clamp arm 93 has been swung to inactive position and the book or fixture 31 with the insert strip unit clamped therein has been positioned on the upper surfaces of the jaw members 43 and 50 and on the supporting screws 98 and with the plastic strips 26 and 27 on the butt ends of the pins 25 extending downwardly into the space between the jaws 43 and 50. When the conditions just described have been attained the operator swings the clamp arm 93 outwardly over the book or fixture with the shoe 96 in position to engage the fixture. The capstan nut 92 is then screwed down and the fixture is clamped with a light spring-tensioned clamping force onto the supporting screws 98 and the two adjacent edges of the jaws 43 and 50 against upward movement but can centralize itself so the pin butts will be disposed centrally of the plastic base.

The operator now swings the wrench or lever that is applied to the squared end 68a of the shaft to straighten the toggle 66, 67. The straightening of this toggle first causes the yoke 58 to move to transmit through the springs 59 movement to the rods 49 to move the movable jaw 50 until it engages the plastic base of the insert unit which is still at substantially room temperature. Then the completion of the straightening of the toggle causes the ears 58a of the yoke 58 to compress the springs 59 and to move slightly away from the collars 57 of the sleeves 56, since the movement of the movable jaw 50 is resisted now by its engagement with the still cold plastic base of the strip insert unit.

During the straightening of the toggle and the movement of the movable jaw as just explained, the plate 88 and the bottom jaw 87 are raised by the actuating arms 89 substantially to their final raised position and the caming surfaces 82a and 88b are disposed to allow the rocker arms 82 to rock inwardly under the action of spring 86, but the pawls 73 have moved under the hooked ends 78 of the members 79 and hold said members and rocker arms 82 and end jaws 80 outwardly against the action of the spring 86. However, the pawls 73 are almost in a position to move out of engagement with said hooked ends 78 upon further inward movement of the movable jaw 50.

The operator now starts the timing clock 116 and the first lobe of the cam 117 closes the microswitch 118 to energize the heating units 111. The first cam lobe holds the microswitch 118 closed for the required time and then passes out of engagement with said switch which thereupon opens. However, the temperature of the jaws 43 and 50 continues to increase even though the current to the heaters is now disconnected.

The period starting with the engagement of the switch 118 with the first cam lobe and extending to the engagement of said switch by the second cam lobe constitutes the flow period of the molding operation and during this period the plastic strips are softened by the heat so the plastic can flow around the pin butts and conform itself to the space between the jaws. As the plastic softens under the heat the compressed springs 59 acting through the sleeves 56 and rods 49 cause the movable jaw 50 to move inwardly and mold the flowing plastic to its final required thickness. This continued slight movement of the movable jaw 50 causes the pawls 73 to move out of contact with the hooked ends 78 of the members 79 to release said members for inward movement, whereupon the compressed spring 86 rocks the rocker arms 82 and moves said members 79 and their end jaws 80 inwardly with a hammer-like blow to mold the end plastic strips 27 to properly embed the end pin butts and to provide the required length and thickness to the end of the base of the insert unit.

The movable jaw 50 and the end jaws 80 are held in position under spring tension by the springs 59 and 86, respectively. At this time the second cam lobe closes the switch 118 and the heaters 111 are again in the electrical circuit to cause a further build-up in the temperature of the molds.

The second cam lobe is of predetermined length and is the longest of the three cam lobes. The time during which the second cam lobe maintains the switch 118 closed constitutes the bonding period of the molding operation wherein the bonding material on the pin butts and on the plastic strips is bonded to the butts and to the plastic strips and the latter are bonded together. Near the end of the bonding period the second cam lobe passes out of contact with the switch 118 and the latter momentarily opens and remains open until the third cam lobe engages said switch and closes the same.

During the interval that the switch 118 is open between its engagement by the second and third cam lobes the heat in the jaws continues to build up and the bonding operation is completed. Then the third cam lobe engages the switch 118 to close the same and again place the heaters 111 in the circuit to build the temperature of the jaws to the maximum predetermined temperature required to cure or set the plastic material and this period may be designated as the setting period. However, the third cam lobe is of such length that it will continue to hold the switch 118 closed after the maximum temperature has been attained and during the cooling period. When the maximum temperature is attained the thermostat controlled switch 109 opens whereupon relay coil 134 in line 133 is energized to actuate the relay 127 so that contact 138 is closed, contact 135 is open, contact 131 is closed and contact 126 is open. The opening of contact 126 breaks the circuit through the heaters while the closing of contact 131 energizes solenoid 130 and opens the control valve for the water or coolant so that the water or coolant will flow through the bores 102 in the jaws 43 and 50 to rapidly cool the jaws and the molded base of the pin strip insert unit. The third cam lobe keeps the switch 118 closed sufficiently long to complete the cooling operation, and it will be seen that although the thermostat 109 might close during this operation the circuit through the heaters will not be closed because contact 126 is maintained open by the energization of relay coil 134. When the third lobe passes out of engagement with the switch 118 said switch opens and the condition shown in Fig. 14 obtains wherein the heaters 111 are deenergized and the control valve for the water is closed. This condition continues a sufficient length of time to enable the operator to remove the finished unit from the mold by releasing the toggle and opening the jaws 43 and 50 and then mounting and clamping on the apparatus to repeat the operation hereinbefore set forth a second fixture with an insert unit clamped therein and the base of which is to be molded.

When the second fixture with the new insert to be molded has been clamped and positioned on the apparatus the first lobe of the cam 117 will then close the microswitch 118 and the operation is repeated in accordance with the description hereinbefore given. If the operator finds that he cannot complete the unloading of the finished insert unit and its fixture or book from the molding apparatus and the loading therein of the second fixture with the new insert unit clamped therein before the first cam lobe again closes switch 118 he may throw the main switch 114 to stop the clock in order to give him sufficient time.

When the toggle 66, 67 is released or broken to open the jaws 43 and 50 to unload from the molding apparatus the fixture or book with the finished pin strip insert unit therein preparator to loading in the apparatus a second fixture or book with a pin strip insert unit to be molded the following occurs.

The releasing of the toggle to the dot-dash line position of Fig. 7 moves the yoke 58 toward the vertical plate 42 and the ears 58a engage the shoulder 57 and positively move the sleeves 56 and rods 49 to move the jaw 50 and clamp plate 53 away from the stationary jaw 43. This movement of the jaw 50 and plate 53 causes the actuating arms 89 and their outer ends 89a to move the vertically movable plate 88 and bottom jaw 87 downwardly from the position of Fig. 12 to the position of Fig. 11. The downward movement of plate 88 from its raised position of Figs. 9 and 12 to its lowered position of Figs. 10 and 11 causes camming surfaces 88b of plate 88 to act on camming surfaces 82a of the rocker arms 82 to rock said arms outwardly from the position of Fig. 9 to that of Fig. 10 and through the heads 84 compress the spring 86. The outward rocking of the arms 82 moves the slide members 79 and end jaws 80 outwardly from the position of Fig. 9 to the position of Fig. 10. During the initial portion of the opening movement of jaw 50 and clamp plate 53 and before the members 79 have moved outwardly the holding pawls 73 pivoted on plate 72 strike the hooked ends 78 of the members 79 without harm as the hooked ends 78 merely depress the pivoted pawls 73 against the action of the springs 74 so the pawls pass beneath the same. As soon as the pawls 73 have cleared the hooked ends 78 during the opening movement of the jaw 50 the springs 74 swing the pawls 73 to their raised position against the stop pins. When the side members 79 are in their outer position of Fig. 10 and during the initial portion of the closing movement of jaw 50 prior to the plate 88 being raised by the arms 89, the pawls 73 can pass beneath the members 79 and behind the hooked ends 78 thereof to restrain inward movement of the slide members 79 until the pawls 73 have moved out of engagement with the hooked ends just as the closing movement of jaw 50 terminates.

Although preferred embodiments of the invention have been illustrated and/or described it will be understood such embodiments are only illustrative and that the invention is susceptible of various modifications and adaptations thereof within the scope of the appended claims.

Having thus described my invention, I claim:

1. A molding apparatus for molding the plastic base of a pin strip insert unit comprising a base plate, a vertical plate secured to said base plate and extending transversely of the base plate, guide sleeves extending through said vertical plate above said base plate and clamped to said vertical plate and located adjacent the opposite ends thereof, a stationary molding jaw having its opposite end secured to said guide sleeves, rods slidable in said guide sleeves and having connected thereto adjacent one of their ends a movable molding jaw, said rods being connected at their other ends to connecting sleeves provided with external shoulders, a linearly movable actuating member having portions slidable on said connecting sleeves, coil springs surrounding said conecting sleeves and having one of their ends abutting said portions of said actuating member and their other ends abutting means on said connecting sleeves and spaced axially thereof from said shoulders, and means for moving said actuating member linearly in one direction to cause said portions of said member to act through said coil springs to move said connecting sleeves and said rods in a direction to move said movable molding jaw toward said stationary molding jaw and for moving said actuating member in the opposite direction to cause said portions to engage said external shoulders to positively move said rods and connecting sleeves and said movable molding jaw in a direction away from said stationary molding jaw.

2. A molding apparatus for molding the plastic base of a pin strip insert unit as defined in claim 1 and wherein there is a third molding jaw located intermediate said stationary and movable jaws and movable transversely of the direction of movement of said movable molding jaw, and means movable with said movable molding jaw for moving said third molding jaw into and out of molding position.

3. A molding apparatus as defined in claim 2 and wherein movable end molding jaws are provided to move inwardly and outwardly between said stationary and movable molding jaws from the opposite ends thereof to mold the ends of the base of the insert unit, spring means acting to move said end molding jaws inwardly to molding position, means movable with said movable molding jaw and engaging said end molding jaws to hold the latter outwardly away from molding position during the major portion of the movement of the movable molding jaw toward the stationary molding jaw and then releasing said end molding jaws in the latter portion of such movement so said end molding jaws are moved inwardly to molding position under the action of said spring means.

4. A molding apparatus as defined in claim 3 and wherein said end molding jaws are connected to rockable arms and said spring means acts on said arms to rock the same in an inward or molding direction while said third molding jaw and said rocker arms are provided with cooperating camming surfaces which act during movement of said third molding jaw out of molding position to rock said arms outwardly against the action of said spring means and move said end molding jaws outwardly from molding position and acting during movement of said third molding jaw to molding position to allow said rocker arms to rock inwardly under the action of said spring means and said end molding jaws to move to molding position.

5. A molding apparatus for molding the plastic base of a pin strip insert unit comprising a stationary molding jaw, a movable molding jaw, means for moving said movable jaw toward said stationary jaw with a spring tensioned force and away from said stationary jaw with a positive force, heating units carried by said stationary and movable jaws, coolant circulating passages in said movable and stationary jaws, a coolant circulating system connected to said passages and including a normally closed shutoff valve, electrical control and supply circuits connected to said heating units and including a normally closed thermostatically actuated switch, the thermal responsive element of which is carried by one of said molding jaws, and an electromotive device for opening said shutoff valve, said circuits including means acting when said thermostatically controlled switch opens upon a predetermined temperature being reached during the molding operation to automatically open the circuit to the heating units and to energize said electromotive device to open said shutoff valve and cause coolant to flow through said passages, a bottom movable molding jaw member located intermediate the stationary and movable molding jaws and movable transversely of the path of movement of said movable molding jaw to and from a position for molding the bottom of the base of the insert, means for actuating said bottom movable molding jaw member to and from molding position in response to the movement of said movable molding jaw, end molding jaws movable intermediate the stationary and movable molding jaws at the opposite ends thereof, spring means acting to normally move said end molding jaws to molding position, and means controlled by the movement of the movable molding jaw to hold said end molding jaws out of molding position and then release the same for movement to molding position under the action of said spring means.

6. A molding apparatus for molding the plastic base of a pin strip insert unit and comprising a base plate, a stationary molding jaw, a movable molding jaw, guide rails secured to said base plate and extending between said movable and stationary jaws adjacent the opposite ends thereof, means connected to said movable molding jaw for movement therewith and guided by said guide rails, pivotally mounted rocker arms connected with said guide rails intermediate the ends of said arms and mounting at one end inwardly and outwardly movable end molding jaws and connected at their other end to a spring acting to rock said arms to move said end molding jaws inwardly, said end molding jaws including portions extending outwardly beyond and over said guide rails and provided at their ends with a hook, and pivoted spring pressed pawls carried by said first mentioned means and engageable with the hooked ends of said outwardly extending portions of said end molding jaws during a part of the movement of the movable molding jaw toward the stationary molding jaw and then disengageable from said hooked ends to release said end molding jaws and rocker arms for inward movement under the action of said spring.

7. A molding apparatus as defined in claim 6 and wherein a movable plate is provided intermediate said stationary and movable molding jaws and mounts a bottom molding jaw on its upper edge, said plate being provided with spaced openings, and said means which moves with said movable molding jaw being provided with actuating cam arms extending through said openings, wherefore movement of said movable molding jaw in opposite directions effects movement of said plate and bottom molding jaw in opposite directions.

References Cited in the file of this patent

UNITED STATES PATENTS

| | | |
|---|---|---|
| 899,280 | Young | Sept. 22, 1908 |
| 2,072,694 | Walter | Mar. 2, 1937 |
| 2,193,395 | Dewey | Mar. 12, 1940 |
| 2,272,850 | Poole | Feb. 10, 1942 |
| 2,317,110 | Person | Apr. 20, 1943 |
| 2,353,825 | Hoffmann | July 18, 1944 |
| 2,409,565 | Holdsworth | Oct. 15, 1946 |
| 2,443,430 | Nigro | June 15, 1948 |
| 2,470,089 | Booth | May 17, 1949 |
| 2,519,171 | Bolten | Aug. 15, 1950 |
| 2,536,506 | Kleber | Jan. 2, 1951 |
| 2,551,960 | Meyer | May 8, 1951 |
| 2,711,567 | Knapp | June 28, 1955 |